United States Patent
Chen et al.

(10) Patent No.: US 10,827,382 B2
(45) Date of Patent: Nov. 3, 2020

(54) INFORMATION PROCESSING METHOD AND APPARATUS

(71) Applicant: HUAWEI TECHNOLOGIES CO., LTD., Guangdong (CN)

(72) Inventors: Yiliang Chen, Shanghai (CN); Shaofei Liu, Shanghai (CN); Genjie Chen, Shanghai (CN); Wei Liu, Shanghai (CN); Hao Chen, Shanghai (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 16/149,527

(22) Filed: Oct. 2, 2018

(65) Prior Publication Data

US 2019/0037438 A1    Jan. 31, 2019

Related U.S. Application Data (63) Continuation of application No. PCT/CN2016/078524, filed on Apr. 6, 2016.

(51) Int. Cl.
*H04W 28/04* (2009.01)
*H04L 5/00* (2006.01)
*H04W 72/12* (2009.01)

(52) U.S. Cl.
CPC .............. *H04W 28/04* (2013.01); *H04L 5/001* (2013.01); *H04L 5/0055* (2013.01); *H04L 5/0057* (2013.01); *H04W 72/1273* (2013.01)

(58) Field of Classification Search
None
See application file for complete search history.

(56) References Cited

U.S. PATENT DOCUMENTS

2013/0250925 A1 * 9/2013 Lohr .................. H04W 72/0446
370/336
2013/0343238 A1   12/2013 Seo et al.
(Continued)

FOREIGN PATENT DOCUMENTS

CN    102742206 A    10/2012
CN    103210604 A    7/2013
(Continued)

OTHER PUBLICATIONS

International Search Report, dated Jan. 9, 2017, in International Application No. PCT/CN2016/078524 (4 pp.).
(Continued)

*Primary Examiner* — Kodzovi Acolatse
(74) *Attorney, Agent, or Firm* — Womble Bond Dickinson (US) LLP (57) ABSTRACT

An information processing method and apparatus are disclosed in a multicarrier communications system. In the multicarrier communications system, a terminal is configured with a PCC and at least one SCC. A first base station in which the PCC is located transmits downlink data to the terminal by using a PDSCH on the PCC; and the first base station demodulates a PUCCH on the PCC by using a first format and a second format, to obtain feedback information sent by the terminal, where the first format is a PUCCH format used for a single serving cell, and the second format is a PUCCH format used for a plurality of serving cells. Therefore, a problem that downlink retransmission is continually performed because feedback information cannot be demodulated due to inconsistent PUCCH formats is resolved.

9 Claims, 4 Drawing Sheets

(56) References Cited

U.S. PATENT DOCUMENTS

| | | | |
|---|---|---|---|
| 2014/0029586 A1* | 1/2014 | Loehr | H04W 56/0005 370/336 |
| 2014/0092865 A1* | 4/2014 | Heo | H04W 52/0209 370/331 |
| 2014/0119284 A1 | 5/2014 | Baldemair et al. | |
| 2014/0161060 A1 | 6/2014 | Nam et al. | |
| 2016/0174211 A1 | 6/2016 | Gao et al. | |
| 2016/0234000 A1 | 8/2016 | Lee et al. | |
| 2016/0286449 A1* | 9/2016 | Choi | H04W 36/28 |
| 2016/0302183 A1* | 10/2016 | Yang | H04L 5/1415 |
| 2016/0360420 A1* | 12/2016 | Liu | H04W 74/0816 |
| 2017/0111901 A1 | 4/2017 | Chu | |
| 2017/0208483 A1* | 7/2017 | Chmiel | H04L 5/001 |
| 2017/0222781 A1 | 8/2017 | Han et al. | |

FOREIGN PATENT DOCUMENTS

| | | |
|---|---|---|
| CN | 103283171 A | 9/2013 |
| CN | 103748821 A | 4/2014 |
| CN | 104348589 A | 2/2015 |
| CN | 104604177 A | 5/2015 |
| CN | 104955151 A | 9/2015 |
| EP | 2639984 A2 | 9/2013 |
| WO | 2013169168 A8 | 1/2015 |

OTHER PUBLICATIONS

Written Opinion of the International Searching Authority, dated Jan. 9, 2017, in International Application No. PCT/CN2016/078524 (7 pp.).

Extended European Search Report dated Mar. 6, 2019 in corresponding European Patent Application No. 16897529.0 (8 pages).

3GPP TS 36331 V10.15.0 (Dec. 2014);3rd Generation Partnership Project;Technical Specification Group Radio Access Network;Evolved Universal Terrestrial Radio Access (E-UTRA);Radio Resource Control (RRC);Protocol specification (Release 10);total 312 pages.

3GPP TSG-RAN WG4 Meeting #69,R4-135902 Discussion of performance requirements for Band 23 intra-band contiguous CA Huawei, HiSilicon, DISCH Network San Francisco, CA, US, Nov. 11-15, 2013 total 5 pages.

3GPP TS 36.213 V13.1.0 3rd Generation Partnership Project;Technical Specification Group Radio Access Network;Evolved Universal Terrestrial Radio Access (E-UTRA);Physical layer procedures(Release 13) Mar. 2016 total 363 pages.

* cited by examiner

INFORMATION PROCESSING METHOD AND APPARATUS

CROSS-REFERENCE TO RELATED APPLICATIONS

This application is a continuation of International Application No. PCT/CN2016/078524, filed on Apr. 6, 2016, the disclosure of which is hereby incorporated by reference in its entirety.

TECHNICAL FIELD

Embodiments of the present invention relate to the field of mobile communications technologies, and in particular, to an information processing method and apparatus.

BACKGROUND

With development of mobile communications technologies, intelligent terminals are increasingly popular, and data service traffic explosively grows. To better cope with this growth and provide a mobile subscriber with faster and richer service experience, a carrier aggregation (CA) technology is introduced into a mobile communications system. In the CA technology, higher system bandwidth is obtained through aggregation of a plurality of contiguous or non-contiguous carriers, so as to increase a peak rate and a system throughput. The aggregated carriers are referred to as component carriers (CC). Each CC may be corresponding to one serving cell. These serving cells may be located in a same base station or different base stations.

The aggregated CCs include a primary component carrier (PCC) and at least one secondary component carrier (SCC). A cell corresponding to the PCC is a primary cell (PCell), is a cell initially accessed by a terminal, and is responsible for radio resource control (RRC) communication with the terminal. A cell corresponding to the SCC is a secondary cell (SCell), and may be added during RRC reconfiguration to provide extra radio resources. A base station side may schedule a physical downlink shared channel (PDSCH) on both the PCC and the SCC. The terminal provides a feedback for transmission on the PDSCH by using a physical uplink control channel (PUCCH) of the PCell, and the base station demodulates the feedback.

Currently, in a demodulation process, a problem such as downlink retransmission usually occurs due to relatively low demodulation reliability, resulting in a decrease in a downlink throughput rate of a CA terminal.

SUMMARY

Embodiments of the present invention provide an information processing method and apparatus, so as to increase a downlink throughput rate of a CA terminal.

A first aspect provides an information processing method, where the method is applied to a multicarrier communications system. In the multicarrier communications system, a terminal is configured with a PCC and at least one SCC. The method includes:

transmitting, by a first base station, downlink data to the terminal by using a PDSCH on the PCC, where the first base station is a base station in which the PCC is located; and demodulating, by the first base station, a PUCCH on the PCC by using a first format and a second format, to obtain feedback information sent by the terminal, where the first format is a PUCCH format used for a single serving cell, and the second format is a PUCCH format used for a plurality of serving cells.

Correspondingly, a second aspect provides an information processing apparatus, applied to a multicarrier communications system. In the multicarrier communications system, a terminal is configured with a PCC and at least one SCC. The apparatus includes:

a first scheduling module, configured to transmit downlink data to the terminal by using a PDSCH on the PCC; and a demodulation module, configured to demodulate a PUCCH on the PCC by using a first format and a second format, to obtain feedback information sent by the terminal, where the first format is a PUCCH format used for a single serving cell, and the second format is a PUCCH format used for a plurality of serving cells.

Correspondingly, a third aspect provides an information processing apparatus, applied to a multicarrier communications system. In the multicarrier communications system, a terminal is configured with a PCC and at least one SCC. The apparatus includes a memory and a processor, the memory stores program code, and the processor invokes the program code to execute the method according to the first aspect.

It may be learned that in the foregoing method and apparatus, the terminal is configured with the PCC and the at least one SCC. Therefore, the terminal may perform downlink transmission by using the PCC and the at least one SCC. However, in a live network, for some reasons, the base station considers that PDSCHs on both the PCC and the SCC are scheduled, but the terminal considers that only the PDSCH on the PCC is scheduled. As a result, the base station and the terminal use different PUCCH formats. In this way, the base station cannot correctly demodulate the PUCCH and cannot obtain the feedback information sent by the terminal, and consequently, continuously performs downlink retransmission.

In the foregoing method and apparatus, regardless of whether a scheduling scenario including a plurality of serving cells actually occurs, the base station demodulates the PUCCH of the terminal by using both the PUCCH format used for a single serving cell and the PUCCH format used for a plurality of serving cells, to obtain the feedback information. Therefore, a problem that downlink retransmission is continually performed because feedback information cannot be demodulated due to inconsistent PUCCH formats is resolved.

In the foregoing aspects, the SCC and the PCC may be located in a same base station or different base stations.

When the SCC and the PCC are located in a same base station, the base station may learn of whether PDSCH scheduling actually occurs on the SCC. Therefore, when the PDSCH scheduling actually occurs on the SCC, the base station may demodulate a PUCCH by using the two PUCCH formats to obtain the feedback information sent by the terminal, so as to save resources of the base station. In this case, before performing a step of demodulating the PUCCH, the first base station schedules the PDSCH on the SCC to perform downlink transmission, that is, sends downlink data to the terminal by using the PDSCH on the SCC, and after this step is performed, demodulates the PUCCH by using the two PUCCH formats. Otherwise, the first format is used, to be specific, the PUCCH is demodulated by using the PUCCH format used for a single serving cell.

When the SCC and the PCC are located in different base stations, the base station in which the PCC is located does not know whether PDSCH scheduling occurs on the SCC. Therefore, the second base station in which the SCC is located may notify the first base station in which the PCC is located of occurrence of the PDSCH scheduling on the SCC. Because there is an inter-base station delay, the second base station in which the SCC is located pre-schedules the PDSCH on the SCC, and may notify the first base station in which the PCC is located of a pre-scheduling status of the SCC. The first base station in which the PCC is located may perform dual-format demodulation on the PUCCH only after obtaining the pre-scheduling status, so as to save resources of the base station. In this case, before performing a step of demodulating the PUCCH, the first base station receives pre-scheduling information that is of the PDSCH on the SCC and that is sent by the second base station.

In the foregoing aspects, when PDSCH scheduling occurs only on the PCC, the feedback information includes feedback information of PDSCH downlink transmission on the PCC. When PDSCH scheduling occurs on both the PCC and the SCC, the feedback information includes feedback information of PDSCH downlink transmission on the PCC and feedback information of PDSCH downlink transmission on the SCC.

Due to impact of a complicated wireless network environment, even if PDSCH scheduling is performed on both a PCC and an SCC on a base station side, it cannot be ensured that the terminal can receive a scheduling indication. Accordingly, when the terminal sends feedback information by using a PUCCH, content of the feedback information may include the foregoing two cases.

In the foregoing aspects, the first format includes Format 1a, Format 1b, Format 2a, or Format 2b, and the second format includes Format 1bcs or Format 3.

For a current application scenario, in dual-carrier aggregation, the first format may be Format 1a, Format 1b, Format 2a, or Format 2b, and the second format may be Format 1bcs or Format 3. In three (or more)-carrier aggregation, the first format may be Format 1a, Format 1b, Format 2a, or Format 2b, and the second format may be Format 3.

In the technical solutions provided above, the first base station transmits the downlink data to the terminal by using the PDSCH on the PCC, and demodulates the PUCCH on the PCC by using the first format and the second format, so as to obtain the feedback information sent by the terminal. Compared with the prior art, in the embodiments of the present invention, the PUCCH is demodulated by using two formats to obtain the feedback information. Therefore, a problem that downlink retransmission is continually performed because feedback information cannot be demodulated due to inconsistent PUCCH formats is resolved.

DESCRIPTION OF EMBODIMENTS

The following clearly describes the technical solutions in the embodiments of the present invention with reference to the accompanying drawings in the embodiments of the present invention. Apparently, the described embodiments are merely some but not all of the embodiments of the present invention. All other embodiments obtained by persons skilled in the art based on the embodiments of the present invention without creative efforts shall fall within the protection scope of the present invention.

The following describes some terms in this application to facilitate understanding of persons skilled in the art.

(1) A terminal is also referred to as user equipment (UE), and is a device that provides a user with voice and/or data connectivity, for example, a handheld device with a wireless connection function or an in-vehicle device with a wireless connection function. A common terminal includes, for example, a mobile phone, a tablet computer, a notebook computer, a palmtop computer, a mobile Internet device (MID), and a wearable device, such as a smart watch, a smart band, or a pedometer.

(2) A radio access network (RAN) device is a device for connecting a terminal to a wireless network, is also referred to as a base station, and includes but is not limited to an evolved NodeB (eNB), a radio network controller (RNC), a NodeB (NB), a base station controller (BSC), a base transceiver station (BTS), a home NodeB (such as a Home evolved NodeB or a Home NodeB, HNB), a baseband unit (BBU), or the like.

(3) A physical uplink control channel (PUCCH) format used for a single serving cell is a PUCCH format designed for a single serving cell before CA is introduced, and may be any one of the following formats in Table 1.

(4) A PUCCH format used for a plurality of serving cells is a PUCCH format designed after CA is introduced, and currently includes Format 1bcs (format 1b with channel selection) or Format 3. Another PUCCH format used for a plurality of serving cells that is introduced as required by communication should also be included within coverage of this term.

(5) "A plurality of" means two or more than two. The term "and/or" describes an association relationship for describing associated objects and represents that three relationships may exist. For example, A and/or B may represent the following three cases: Only A exists, both A and B exist, and only B exists. The character "/" generally indicates an "or" relationship between the associated objects. The terms "first", "second", "third", "fourth", and so on (if existent) are intended to distinguish between similar objects but do not necessarily indicate a specific order or sequence. It should be understood that the data termed in such a way are interchangeable in proper circumstances so that the embodiments of the present invention described herein can be implemented in other orders than the order illustrated or described herein. Moreover, the terms "include", "contain" and any other variants mean to cover the non-exclusive inclusion, for example, a process, method, system, product, or device that includes a list of steps or units is not necessarily limited to those steps or units, but may include other steps or units not listed or inherent to such a process, method, system, product, or device.

Persons skilled in the art should know that the present invention is not only applicable to a Long Term Evolution (LTE) system of a universal mobile communication technology, but also applicable to another wireless communications system, such as a Global System for Mobile Communications (GSM), a Universal Mobile Telecommunications System (UMTS), a Code Division Multiple Access (CDMA) system, and a network system continuously evolved in the future.

Figure 1:
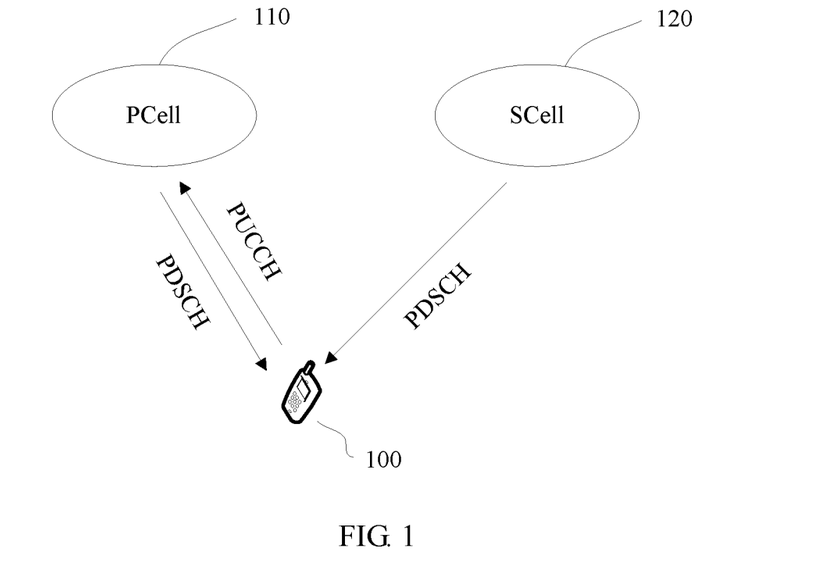
FIG. 1 is a schematic diagram of an embodiment of a CA scenario according to an embodiment of the present invention.

Referring to FIG. 1, FIG. 1 is a schematic diagram of a CA scenario according to an embodiment of the present invention. For ease of description, this embodiment uses two CCs (including one PCC and one SCC) as an example. A scenario including more than two CCs (including one PCC and at least two SCCs) is similar.

As shown in FIG. 1, a terminal 100 supports CA, accesses a wireless network in a cell 110, and establishes an RRC connection to a base station in which the cell 110 is located. Then, the base station configures a cell 120 for the terminal to perform CA. The cell 120 is an SCell, and a corresponding carrier is an SCC. The cell 110 is a PCell, and a corresponding carrier is a PCC. PDSCH scheduling may be performed on the terminal 100 on both the PCell and the SCell, so that data is sent to the terminal 100 by using a PDSCH of the PCell and a PDSCH of the SCell. The terminal 100 feeds back receiving statuses of data on the PDSCH of the PCell and data on the PDSCH of the SCell, and feeds back an ACK when receiving succeeds, or feeds back a NACK when receiving fails. The ACK/NACK is generally transmitted by using a physical uplink control channel (PUCCH), and the PUCCH is transmitted only on the PCell. Therefore, in downlink CA, the terminal may need to use the PUCCH in an uplink subframe of the PCell, to provide ACK/NACK feedbacks for PDSCHs transmitted in downlink subframes corresponding to all serving cells.

The PUCCH is mainly used to carry uplink control information (UCI) sent by the terminal. The uplink control information mainly includes: a scheduling request (SR), hybrid automatic repeat request (HARQ) feedback information such as an ACK or a NACK, namely, a HARQ feedback for downlink data sent on the PDSCH, and channel state information (CSI) that may include, for example, one or more of a channel quality indicator (CQI), a precoding matrix indicator (PMI), and a rank indication (RI).

The PUCCH may be in a plurality of formats, and different formats are used based on different UCI content. For example, Table 1 provides currently supported PUCCH formats and UCI content in each format.

TABLE 1

| PUCCH Format | UCI Content |
| --- | --- |
| Format 1 | SR |
| Format 1a | 1-bit ACK/NACK, or SR and 1-bit ACK/NACK |
| Format 1b | 2-bit ACK/NACK, or SR and 2-bit ACK/NACK |
| Format 2 | CSI |
| Format 2a | CSI and 1-bit ACK/NACK |
| Format 2b | CSI and 2-bit ACK/NACK |

It may be seen from the foregoing table that Format 1 is used for uplink sending an scheduling request by the terminal; Format 1a/1b is used for uplink sending an ACK/NACK by the terminal, and a scheduling request may be simultaneously sent, where for Format 1a, the ACK/NACK occupies one bit, and for Format 1b, the ACK/NACK occupies two bits; Format 2 is used for uplink sending CSI; and Format 2a/2b is used for uplink sending CSI and an ACK/NACK, where for Format 2a, the ACK/NACK occupies one bit, and for Format 2b, the ACK/NACK occupies two bits.

The foregoing PUCCH formats are designed for a single serving cell and cannot meet a CA requirement. Therefore, two PUCCH formats are provided to support CA. The two formats are Format 1bcs and Format 3.

Format 1bcs uses the 2-bit information of Format 1b, and a specific PUCCH resource is used to indicate an ACK/NACK to be sent. Format 1bcs supports a scenario of no more than two serving cells and no more than four bits of ACK/NACK information.

Currently, Format 3 supports a scenario of five serving cells and each serving cell has a multiple-input multiple-output (MIMO) configuration. Certainly, Format 3 can also support a scenario of two serving cells. Whether to use Format 3 or Format 1bcs depends on a configuration of the base station.

After PUCCH formats used for a CA scenario are introduced, the base station and the terminal may use different PUCCH formats due to inconsistent understanding of a current scenario. For example, the base station configures an SCC for the terminal, and PDSCH transmission is also performed on the SCC. Therefore, the base station demodulates a PUCCH by using a PUCCH format used for a plurality of serving cells. For some reasons, the terminal may not know that PDSCH transmission is also performed on the SCC. Therefore, the terminal performs PUCCH transmission by using a PUCCH format used for a single serving cell. In this way, the base station cannot correctly demodulate feedback information of the terminal. Even if the terminal feeds back an ACK, the base station cannot learn of the ACK, and therefore performs downlink retransmission, resulting in a decrease in a downlink throughput rate.

Considering the foregoing problem, this application provides an information processing method. When a base station configures an SCC for a terminal, the base station performs dual-format demodulation on a PUCCH of the terminal, that is, demodulates the PUCCH of the terminal by using two formats. A first format is a PUCCH format used for a single serving cell, and a second format is a PUCCH format used for a plurality of serving cells. In this way, even if the terminal and the base station have inconsistent understanding on a current scenario, and the terminal selects a PUCCH format different from that of the base station, the base station may demodulate the PUCCH by using two formats, so as to obtain feedback information. Therefore, a problem that downlink retransmission is continually performed because feedback information cannot be demodulated due to inconsistent PUCCH formats is resolved.

Figure 2:
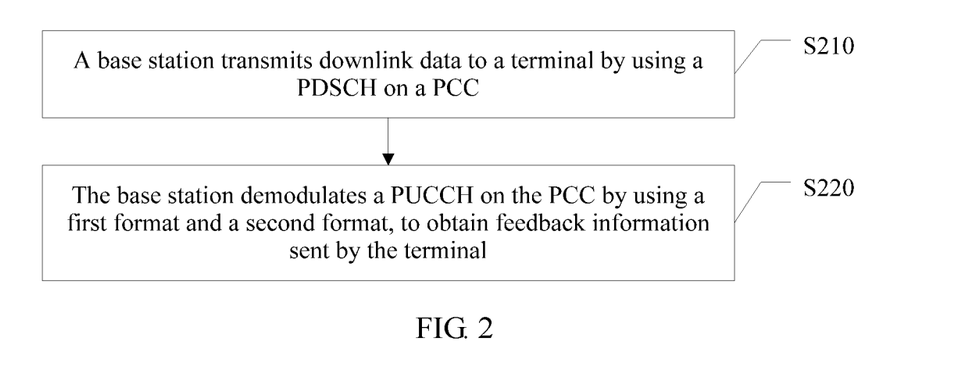
FIG. 2 is a flowchart of an embodiment of an information processing method according to an embodiment of the present invention.

Referring to FIG. 2, FIG. 2 is a flowchart of an information processing method according to an embodiment of the present invention. The method is applied to a multicarrier communications system. In the multicarrier communications system, a terminal is configured with a PCC and at least one SCC, so that downlink transmission of the terminal may be performed by using PDSCHs on the PCC and the at least one SCC. As shown in FIG. 2, the method includes the following steps:

S210. A base station transmits downlink data to the terminal by using a PDSCH on the PCC, that is, the base station schedules the PDSCH on the PCC to perform downlink transmission.

S220. The base station demodulates a PUCCH on the PCC by using a first format and a second format, to obtain feedback information sent by the terminal, where the first format is a PUCCH format used for a single serving cell, and the second format is a PUCCH format used for a plurality of serving cells.

The foregoing base station is a base station in which the PCC is located, and the SCC and the PCC may be located in a same base station or different base stations. When the PCC and the SCC are located in a same base station, the base station may learn of whether PDSCH channel scheduling actually occurs on the SCC, and use the foregoing method when the PDSCH channel scheduling actually occurs. In this way, when the base station configures an SCC for the terminal but does not perform scheduling on a plurality of serving cells, and only performs scheduling on the PCC, dual-format demodulation on the PUCCH may not be performed. Dual-format demodulation on the PUCCH is performed only when PDSCH scheduling is performed on both the PCC and the SCC, so that resources of the base station can be saved.

When the PCC and the SCC are located in different base stations, the base station in which the PCC is located does not know whether PDSCH scheduling occurs on the SCC. To perform dual-format demodulation after determining that a scheduling scenario of a plurality of serving cells, the base station in which the PCC is located needs to be notified, by the base station in which the SCC is located, of occurrence of the PDSCH scheduling on the SCC. However, because there is an inter-base station delay, the base station in which the SCC is located needs to pre-schedule (or referred to as scheduling in advance, that is, pre-allocating a resource for the PDSCH on the SCC before actual scheduling occurs) the PDSCH on the SCC, and may notify the base station in which the PCC is located of a pre-scheduling status of the SCC. The base station in which the PCC is located may perform dual-format demodulation on the PUCCH only after obtaining the pre-scheduling status, so as to save resources of the base station.

Certainly, provided that the base station configures the SCC for the terminal, a dual-format demodulation manner may be used without considering whether a scheduling scenario of a plurality of serving cells actually occurs. This application is not limited thereto.

The following separately uses scenarios including two CCs and three CCs as examples to describe specific applications of the foregoing method. The scenarios are merely used as examples, and are not intended to limit the present invention.

Figure 3:
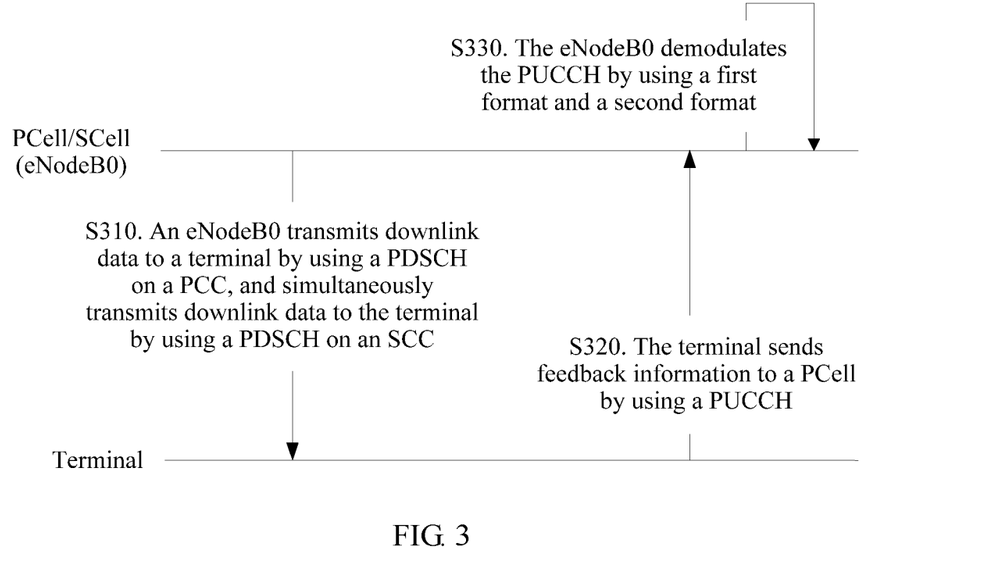
FIG. 3 is a flowchart of another embodiment of an information processing method according to an embodiment of the present invention.

Referring to FIG. 3, FIG. 3 is a flowchart of another information processing method according to an embodiment of the present invention. In this embodiment, a scenario of two CCs in LTE, namely, dual-carrier aggregation, is used as an example. The two CCs include one PCC and one SCC respectively corresponding to a PCell and an SCell, and the PCell and the SCell are located in a same base station, namely, eNodeB0. As shown in FIG. 3, the method includes the following steps:

S310. The eNodeB0 transmits downlink data to a terminal by using a PDSCH on the PCC, and simultaneously transmits downlink data to the terminal by using a PDSCH on the SCC.

S320. The terminal sends feedback information to the PCell by using a PUCCH.

S330. The eNodeB0 demodulates the PUCCH by using a first format and a second format.

The first format may be Format 2a/2b, or may be Format 1a/1b, and the second format may be Format 1bcs or Format 3.

For example, at a moment at which a transmission time interval (TTI)=N, the eNodeB0 sends, to the terminal by using a physical downlink control channel (PDCCH), scheduling information for scheduling PDSCHs on the PCC and the SCC to perform downlink transmission.

At a moment at which a TTI=N+4, if the terminal does not receive the scheduling information and the terminal needs to report CSI, the terminal sends the CSI to the eNodeB0. If the terminal receives the scheduling information and the scheduling information includes scheduling information of the PCell and scheduling information of the SCell, the terminal gives up sending the CSI, and sends, on the PUCCH, feedback information of PDSCH downlink transmission on the PCC and feedback information of PDSCH downlink transmission on the SCC to the PCell by using Format 1bcs. If the terminal receives only the scheduling information of the PCell but does not receive the scheduling information of the SCell, the terminal sends, on the PUCCH, the feedback information of PDSCH downlink transmission on the PCC to the PCell by using Format 2a/2b.

Based on this, the eNodeB0 demodulates the PUCCH on the PCell by using not only Format 1bcs but also Format 2a/2b. One of the two formats used to demodulate the PUCCH is consistent with a PUCCH format used by the terminal. Therefore, the feedback information of the terminal can be correctly demodulated, so as to avoid downlink retransmission.

It should be noted that because the eNodeB0 determines that a PDSCH is scheduled on both the PCell and the SCell, when the PUCCH on the PCell is demodulated, preferably, Format 1bcs is first used for demodulation, and if the demodulation using Format 1bcs fails, demodulation is further performed by using Format 2a/2b. In this way, demodulation efficiency can be improved. Certainly, Format 2a/2b may alternatively be first used for demodulation, and if the demodulation using Format 2a/2b fails, demodulation is further performed by using Format 1bcs. This is not specifically limited herein.

Figure 4:
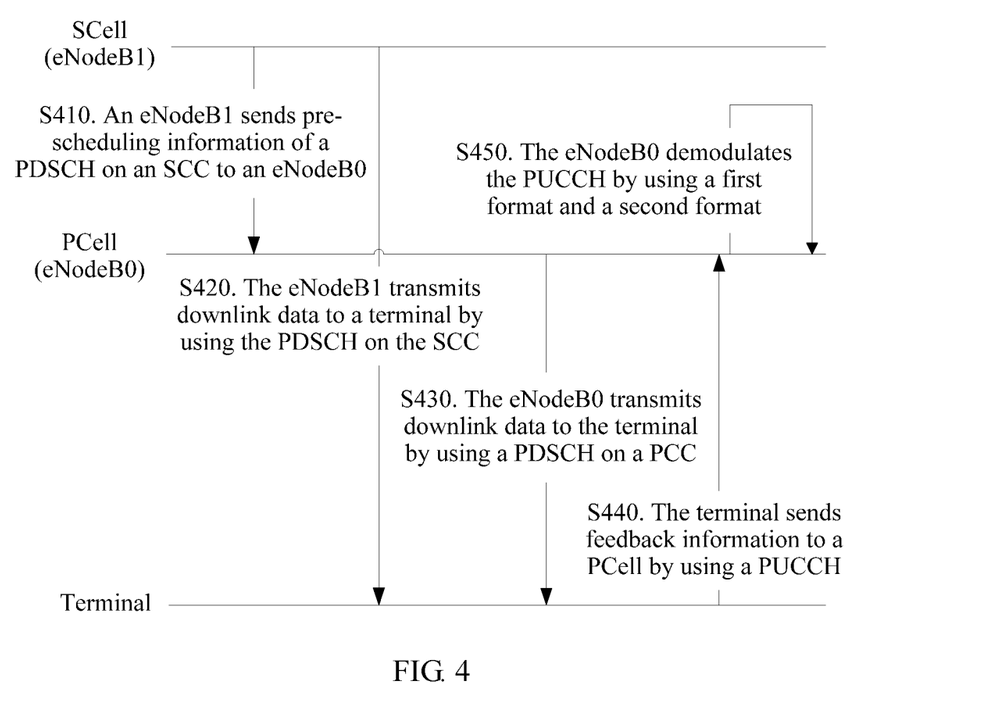
FIG. 4 is a flowchart of another embodiment of an information processing method according to an embodiment of the present invention.

Referring to FIG. 4, FIG. 4 is a flowchart of another information processing method according to an embodiment of the present invention. In this embodiment, a scenario of two CCs in LTE is used as an example. Different from the foregoing embodiment, an SCC and a PCC are located in different base stations. For example, the PCC is corresponding to a PCell and is located in an eNodeB0, and the SCC is corresponding to an SCell and is located in an eNodeB1. As shown in FIG. 4, the method includes the following steps:

S410. The eNodeB1 sends pre-scheduling information of a PDSCH on the SCC to the eNodeB0.

S420. The eNodeB1 transmits downlink data to a terminal by using the PDSCH on the SCC.

S430. The eNodeB0 transmits downlink data to the terminal by using a PDSCH on the PCC.

S440. The terminal sends feedback information to the PCell by using a PUCCH.

S450. The eNodeB0 demodulates the PUCCH by using a first format and a second format.

The first format may be Format 2a/2b, or may be Format 1a/1b, and the second format is Format 1bcs or Format 3.

In the foregoing method, step S420 may not actually occur, that is, actual scheduling does not occur for some reasons, although the eNodeB1 pre-schedules the PDSCH on the SCC. To be specific, for some reasons, the eNodeB1 does not use a resource pre-allocated to the PDSCH on the SCC to transmit downlink data. In this case, the terminal considers that PDSCH scheduling only occurs on the PCC, and sends feedback information to the PCell by using Format 2a/2b. However, because the eNodeB0 receives the pre-scheduling information, the eNodeB0 demodulates the PUCCH by using Format 1bcs or Format 3. Consequently, the PUCCH cannot be correctly demodulated because a PUCCH format used by the eNodeB0 is inconsistent with a PUCCH format used by the terminal. According to the foregoing method, the eNodeB0 performs demodulation by using two formats that are used for both a single serving cell and two serving cells, so that one of the two formats is consistent with the format used by the terminal. Therefore, the PUCCH can be successfully demodulated to obtain the feedback information of the terminal.

It may be learned that different from the foregoing embodiment, in this embodiment, the SCC and the PCC are located in different base stations. Therefore, the eNodeB1 in which the SCC is located needs to notify the eNodeB0 in which the PCC is located of a scheduling status of the SCC. Because there is an inter-base station delay, the eNodeB1 pre-schedules the PDSCH on the SCC, and notifies the eNodeB0 of a pre-scheduling status of the SCC. After learning of the pre-scheduling information that the PDSCH is to be scheduled by the eNodeB1 on the SCC, the eNodeB0 demodulates the PUCCH by using two formats, so as to correctly demodulate the feedback information of the terminal, thereby avoiding downlink retransmission.

Figure 5:
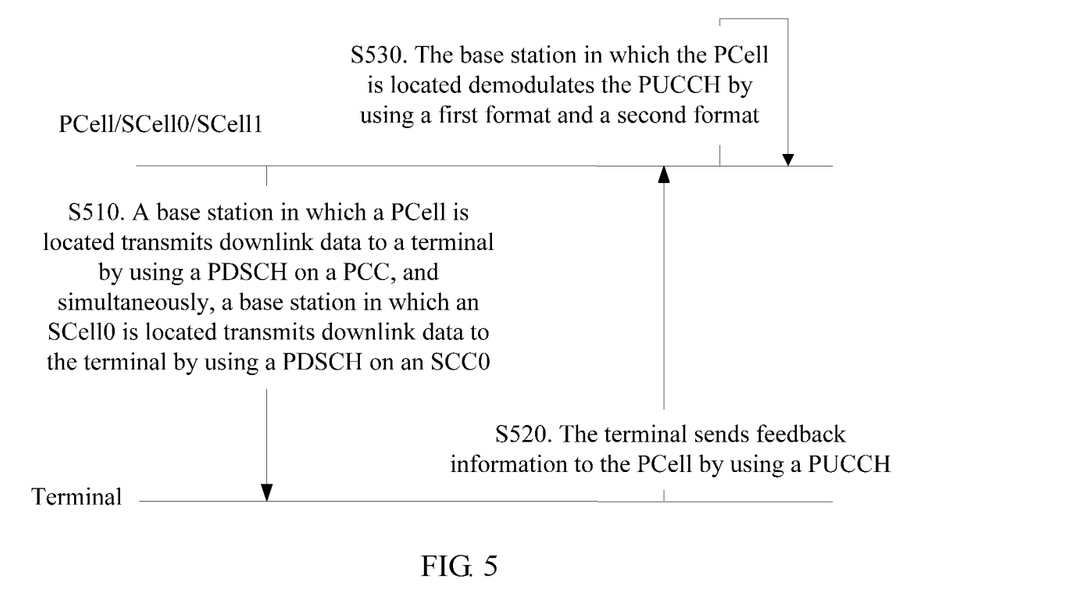
FIG. 5 is a flowchart of another embodiment of an information processing method according to an embodiment of the present invention.

Referring to FIG. 5, FIG. 5 is a flowchart of another information processing method according to an embodiment of the present invention. In this embodiment, a scenario of three CCs in LTE, namely, three-carrier aggregation, is used as an example. The three CCs include one PCC and two SCCs (for example, an SCC0 and an SCC1). If a base station side schedules PDSCHs on the PCC and at least one SCC (for example, the SCC0), but for some reasons, a terminal does not receive a PDCCH delivered on the SCC (for example, the SCC0), the terminal considers that scheduling is currently performed only on the PCC, and then feeds back ACK/NACK information on a PUCCH by using a PUCCH format used for a single serving cell. However, the base station side demodulates the ACK/NACK information of the terminal on the PUCCH by using a PUCCH format (Format 3) used for a plurality of serving cells. Because the formats are inconsistent, the base station side cannot demodulate the ACK/NACK information. In this case, the method shown in FIG. 5 is used, and the base station demodulates the PUCCH by using two formats, so that one of the two formats is consistent with the format used by the terminal, so as to demodulate the ACK/NACK information of the terminal.

As shown in FIG. 5, the method includes the following steps:

S510. A base station in which a PCell is located transmits downlink data to the terminal by using a PDSCH on the PCC, and simultaneously, a base station in which an SCell0 is located transmits downlink data to the terminal by using a PDSCH on the SCC0.

S520. The terminal sends feedback information to the PCell by using a PUCCH.

S530. The base station in which the PCell is located demodulates the PUCCH by using a first format and a second format.

The first format may be Format 1a/1b, or may be Format 2a/2b, and the second format is Format 3.

In this embodiment, the PCell, the SCell0, and an SCell1 may be located in a same base station, or may be located in two or three different base stations. This is not specifically limited herein, provided that the SCell0 and/or the SCell1 located in a different base station from the base station in which the PCell is located sends pre-scheduling information to the PCell before scheduling a PDSCH.

The foregoing describes the information processing method in the embodiment of the present invention. The following describes an information processing apparatus in an embodiment of the present invention. The apparatus is applied to a multicarrier communications system. In the multicarrier communications system, a terminal is configured with a PCC and at least one SCC, and downlink transmission of the terminal may be performed by using PDSCHs on the PCC and the at least one SCC.

Figure 6:
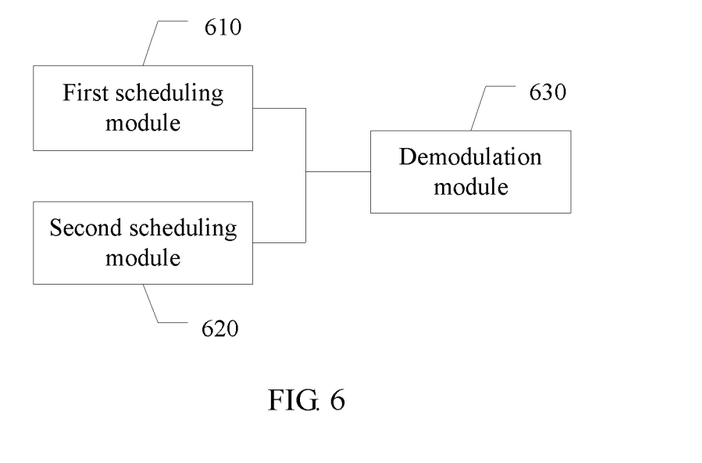
FIG. 6 is a module block diagram of an embodiment of an information processing apparatus according to an embodiment of the present invention.

Referring to FIG. 6, FIG. 6 is a module block diagram of an embodiment of the information processing apparatus according to this embodiment of the present invention. The SCC and the PCC are located in a same base station. As shown in FIG. 6, the apparatus includes:

a first scheduling module 610, configured to schedule a PDSCH on the PCC to perform downlink transmission, that is, transmit downlink data to the terminal by using the PDSCH on the PCC;

a second scheduling module 620, configured to schedule a PDSCH on the SCC to perform downlink transmission, that is, transmit downlink data to the terminal by using the PDSCH on the SCC; and a demodulation module 630, configured to demodulate a PUCCH on the PCC by using a first format and a second format, to obtain feedback information sent by the terminal, where the first format is a PUCCH format used for a single serving cell, and the second format is a PUCCH format used for a plurality of serving cells.

It should be noted that the foregoing modules may be separately disposed processing elements, or may be integrated into a chip of the base station for implementation, or may be stored in a memory of the base station in a form of program code and invoked by a processing element of the base station to implement functions of the foregoing units (modules). In addition, the units may be integrated, or may be implemented separately. The processing element described herein may be a central processing unit (CPU), or an application-specific integrated circuit (ASIC), or one or more integrated circuits configured to implement the foregoing method, for example, one or more microprocessors (digital signal processor, DSP), or one or more field programmable gate arrays (FPGA).

Figure 7:
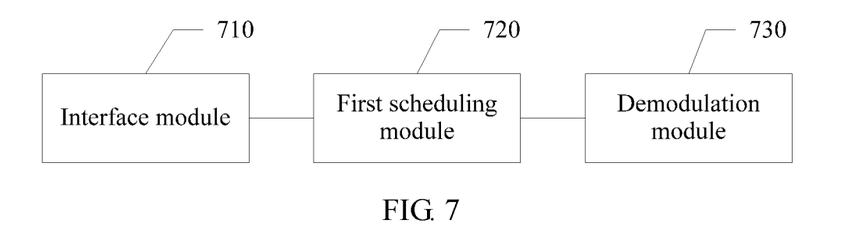
FIG. 7 is a module block diagram of another embodiment of an information processing apparatus according to an embodiment of the present invention.

Referring to FIG. 7, FIG. 7 is a module block diagram of another embodiment of the information processing apparatus according to this embodiment of the present invention. The SCC and the PCC are located in different base stations. As shown in FIG. 7, the apparatus includes:

an interface module 710, configured to receive pre-scheduling information that is of a PDSCH on the SCC and that is sent by a second base station in which the SCC is located;

a first scheduling module 720, configured to schedule a PDSCH on the PCC to perform downlink transmission, that is, transmit downlink data to the terminal by using the PDSCH on the PCC; and a demodulation module 730, configured to demodulate a PUCCH on the PCC by using a first format and a second format, to obtain feedback information sent by the terminal, where the first format is a PUCCH format used for a single serving cell, and the second format is a PUCCH format used for a plurality of serving cells.

When the terminal receives scheduling information of a PCell, the feedback information includes feedback information of PDSCH downlink transmission on the PCC. When the terminal receives scheduling information of a PCell and scheduling information of an SCell, the feedback information includes feedback information of PDSCH downlink transmission on the PCC and feedback information of PDSCH downlink transmission on the SCC.

In addition, when the multicarrier communications system uses dual-carrier aggregation, the first format is Format 1a/1b, or Format 2a/2b, and the second format is Format 1bcs or Format 3. When the multicarrier communications system uses three (or more)-carrier aggregation, the first format is Format 1a/1b, or Format 2a/2b, and the second format is Format 3. Specifically, whether Format 1a/1b, or Format 2a/2b is used may be determined based on content of uplink control information, and for dual-carrier aggregation, whether Format 1bcs or Format 3 is used may be configured by the base station.

It should be noted that the interface module 710 is configured to implement communication with another base station, and may be, for example, an X2 interface module. Other modules may be separately disposed processing elements, or may be integrated into a chip of the base station for implementation, or may be stored in a memory of the base station in a form of program code and invoked by a processing element of the base station to implement functions of the foregoing units. In addition, the units may be integrated, or may be implemented separately. The processing element described herein may be a central processing unit (CPU), or an application-specific integrated circuit (ASIC), or one or more integrated circuits configured to implement the foregoing method, for example, one or more microprocessors (digital signal processor, DSP), or one or more field programmable gate arrays (FPGA).

Figure 8:
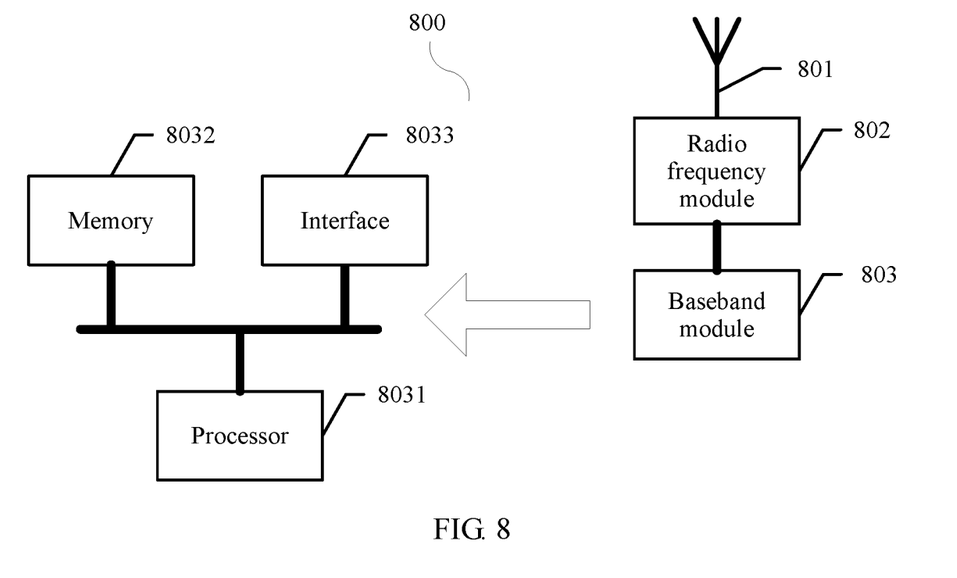
FIG. 8 is a hardware block diagram of an embodiment of an information processing apparatus according to an embodiment of the present invention.

Referring to FIG. 8, FIG. 8 is a hardware block diagram of an embodiment of an information processing apparatus according to an embodiment of the present invention. The apparatus 800 is located in a base station, and the base station is applied to a multicarrier communications system. In the multicarrier communications system, a terminal is configured with a PCC and at least one SCC, and downlink transmission of the terminal may be performed by using PDSCHs on the PCC and the at least one SCC. As shown in FIG. 8, the base station includes:

an antenna 801, a radio frequency apparatus 802, and a baseband apparatus 803.

The antenna 801 is connected to the radio frequency apparatus 802, and the radio frequency apparatus 802 receives feedback information on a PUCCH on the PCC through the antenna 801. The radio frequency apparatus 802 sends the feedback information to the baseband apparatus 803. The baseband apparatus 803 is configured to demodulate and process the feedback information, and determine, based on the feedback information, whether to perform downlink retransmission.

The foregoing apparatus 800 may be located in the baseband apparatus 803, including a processor 8031 and a memory 8032. The baseband apparatus 803 may include, for example, at least one baseband board, where a plurality of chips are disposed on the baseband board. As shown in FIG. 8, one chip is, for example, the processor 8031, which is connected to the memory 8032, so as to schedule a program in the memory 8032 to perform an operation shown in the foregoing method embodiments. The baseband apparatus 803 may further include an interface 8033, configured to exchange information with the radio frequency apparatus 802. The interface is, for example, a common public radio interface (CPRI).

For example, the foregoing first scheduling module 610 and the second scheduling module 620 may be implemented by using one chip in the baseband apparatus 803, and the demodulation module 630 is implemented by using another chip; or the first scheduling module 610, the second scheduling module 620, and the demodulation module 630 are integrated and implemented by using one chip; or functions of the first scheduling module 610, the second scheduling module 620, and the demodulation module 630 are stored in the memory 8032 in a form of program code, and are invoked by the processor 8031 for implementation. For another example, the foregoing first scheduling module 720 and the demodulation module may be separately implemented by using two chips, or may be implemented by using one chip; or functions of the first scheduling module 720 and the demodulation module may be stored in the memory 8032 in a form of program code, and may be invoked by the processor 8031 for implementation. The interface 8033 may be implemented by disposing an interface circuit that supports an X2 protocol. Certainly, when no X2 interface exists between two base stations, the interface 8033 may be implemented by using an S1 interface in a core network or a wireless interface. This is not limited in this application.

It may be clearly understood by persons skilled in the art that, for the purpose of convenient and brief description, for a detailed working process of the foregoing system, apparatus, and unit, reference may be made to a corresponding process in the foregoing method embodiments, and details are not described herein.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or some of the technical solutions may be implemented in the form of a software product. The software product is stored in a storage medium and includes several instructions for instructing a computer device (which may be a personal computer, a server, or a network device) to perform all or some of the steps of the methods described in the embodiments of the present invention. The foregoing storage medium includes: any medium that can store program code, such as a USB flash drive, a removable hard disk, a read-only memory (ROM), a random access memory (RAM), a magnetic disk, or an optical disc.

The foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present invention.

What is claimed is:

1. An information processing method, applied to a multicarrier communications system, wherein in the multicarrier communications system, a terminal is configured with a primary component carrier (PCC) and at least one secondary component carrier (SCC), and the method comprises:
    transmitting, by a first base station to the terminal, downlink data by using a physical downlink shared channel (PDSCH) on the PCC, wherein the first base station is a base station in which the PCC is located, wherein the SCC and the PCC are located in different base stations;
    receiving, by the first base station, pre-scheduling information that is of a PDSCH on the SCC and that is sent by a second base station in which the SCC is located; and
    demodulating, by the first base station, a physical uplink control channel (PUCCH) on the PCC by using a first format and a second format, to obtain feedback information sent by the terminal, wherein the first format is a PUCCH format used for a single serving cell, and the second format is a PUCCH format used for a plurality of serving cells;
    wherein the feedback information only comprises feedback information of PDSCH downlink transmission on the PCC.

2. The method according to claim 1, wherein the feedback information comprises feedback information of PDSCH downlink transmission on the PCC; or
    the feedback information comprises feedback information of PDSCH downlink transmission on the PCC and feedback information of PDSCH downlink transmission on the SCC.

3. The method according to claim 1, wherein the first format comprises Format 1a, Format 1, Format 2a, or Format 2b; and
    the second format comprises Format 1bcs or Format 3.

4. An information processing apparatus, comprising:
a processor, configured to execute a program stored in a non-transitory computer readable storage medium, and when the program is executed by the processor, the program configures the apparatus to perform:
    transmitting to a terminal downlink data by using a physical downlink shared channel (PDSCH) on a primary component carrier (PCC), wherein the terminal is configured with the PCC and at least one secondary component carrier (SCC), wherein the SCC and the PCC are located in different base stations;
    receiving, by the first base station, pre-scheduling information that is of a PDSCH on the SCC and that is sent by a second base station in which the SCC is located; and
    demodulating a physical uplink control channel (PUCCH) on the PCC by using a first format and a second format, to obtain feedback information sent by the terminal, wherein the first format is a PUCCH format used for a single serving cell, and the second format is a PUCCH format used for a plurality of serving cells;
    wherein the feedback information only com rises feedback information of PDSCH downlink transmission on the PCC.

5. The apparatus according to claim 4, wherein the feedback information comprises feedback information of PDSCH downlink transmission on the PCC; or
    the feedback information comprises feedback information of PDSCH downlink transmission on the PCC and feedback information of PDSCH downlink transmission on the SCC.

6. The apparatus according to claim 4, wherein the first format comprises Format 1a, Format 1b, Format 2a, or Format 2b; and
    the second format comprises Format 1bcs or Format 3.

7. A non-transitory computer readable storage medium, wherein the non-transitory computer readable storage medium stores a program, and when executed by a processor, the program configures the processor to perform:
    transmitting to a terminal downlink data by using a physical downlink shared channel (PDSCH) on a primary component carrier (PCC), wherein the terminal is configured with the PCC and at least one secondary component carrier (SCC), wherein the SCC and the PCC are located in different base stations;
    receiving, by the first base station, pre-scheduling information that is of a PDSCH on the SCC and that is sent by a second base station in which the SCC is located; and
    demodulating a physical uplink control channel (PUCCH) on the PCC by using a first format and a second format, to obtain feedback information sent by the terminal, wherein the first format is a PUCCH format used for a single serving cell, and the second format is a PUCCH format used for a plurality of serving cells;
    wherein the feedback information only comprises feedback information of PDSCH downlink transmission on the PCC.

8. The non-transitory computer readable storage medium according to claim 7, wherein the feedback information comprises feedback information of PDSCH downlink transmission on the PCC; or
    the feedback information comprises feedback information of PDSCH downlink transmission on the PCC and feedback information of PDSCH downlink transmission on the SCC.

9. The non-transitory computer readable storage medium according to claim 7, wherein the first format comprises Format 1a, Format 1b, Format 2a, or Format 2b; and
    the second format comprises Format 1bcs or Format 3.

* * * * *

UNITED STATES PATENT AND TRADEMARK OFFICE
CERTIFICATE OF CORRECTION

PATENT NO. : 10,827,382 B2
APPLICATION NO. : 16/149527
DATED : November 3, 2020
INVENTOR(S) : Yiliang Chen et al.

It is certified that error appears in the above-identified patent and that said Letters Patent is hereby corrected as shown below:

In the Claims

In Claim 3, Column 13, Line 54, delete "Format 1," and insert --Format 1b,--.

In Claim 4, Column 14, Line 14, delete "com rises" and insert --comprises--.

Signed and Sealed this
Sixth Day of April, 2021

Drew Hirshfeld
*Performing the Functions and Duties of the
Under Secretary of Commerce for Intellectual Property and
Director of the United States Patent and Trademark Office*